United States Patent
Paknad et al.

(10) Patent No.: US 8,515,924 B2
(45) Date of Patent: Aug. 20, 2013

(54) METHOD AND APPARATUS FOR HANDLING EDGE-CASES OF EVENT-DRIVEN DISPOSITION

(75) Inventors: Deidre Paknad, Palo Alto, CA (US); Pierre Raynaud-Richard, Redwood City, CA (US); Andrey Pogodin, San Mateo, CA (US)

(73) Assignee: International Business Machines Corporation, Armonk, NY (US)

( * ) Notice: Subject to any disclaimer, the term of this patent is extended or adjusted under 35 U.S.C. 154(b) by 1034 days.

(21) Appl. No.: 12/165,085

(22) Filed: Jun. 30, 2008

(65) Prior Publication Data

US 2009/0327375 A1    Dec. 31, 2009

(51) Int. Cl.
G06F 7/00    (2006.01)
G06F 17/30    (2006.01)

(52) U.S. Cl.
USPC .......................................................... 707/694

(58) Field of Classification Search
USPC .......................................................... 707/694
See application file for complete search history.

(56) References Cited

U.S. PATENT DOCUMENTS

| | | | |
|---|---|---|---|
| 5,313,609 A | 5/1994 | Baylor et al. | |
| 5,355,497 A | 10/1994 | Cohen-Levy | |
| 5,608,865 A | 3/1997 | Midgely et al. | |
| 5,701,472 A | 12/1997 | Koerber et al. | |
| 5,903,879 A | 5/1999 | Mitchell | |
| 5,963,964 A | 10/1999 | Nielsen | |
| 6,049,812 A | 4/2000 | Bertram et al. | |
| 6,115,642 A | 9/2000 | Brown et al. | |
| 6,128,620 A | 10/2000 | Pissanos et al. | |
| 6,151,031 A | 11/2000 | Atkins et al. | |
| 6,173,270 B1 | 1/2001 | Cristofich et al. | |
| 6,330,572 B1 | 12/2001 | Sitka | |
| 6,332,125 B1 | 12/2001 | Callen et al. | |
| 6,343,287 B1 | 1/2002 | Kumar et al. | |
| 6,401,079 B1 | 6/2002 | Kahn et al. | |
| 6,425,764 B1 | 7/2002 | Lamson | |
| 6,460,060 B1 | 10/2002 | Maddalozzo, Jr. et al. | |
| 6,539,379 B1 | 3/2003 | Vora et al. | |

(Continued)

FOREIGN PATENT DOCUMENTS

EP    2110781 A1    10/2009

OTHER PUBLICATIONS

Human Capital Mangement; "mySAP . . . management"; retrieved from archive.org Aug. 18, 2009 www.sap.com.

(Continued)

*Primary Examiner* — Jeffrey A Burke
(74) *Attorney, Agent, or Firm* — Shumaker & Sieffert, P.A.

(57) ABSTRACT

Retention of data is managed and data holds are enforced. At least one event consumer data source contains data that is subject to a retention schedule that defines rules for the disposition of the data. An enterprise retention management (ERM) application accepts at least one hold request that defines at least a portion of the data that must be held from disposition. A disposition request is also accepted by the ERM that comprises an instruction to dispose of at least a portion of the data based on the rules within the retention schedule. The disposition request is filtered to dispose of the portion of data identified in the disposition request minus the held data, which comprises disposition survivor data. An event-driven disposition mechanism disposes of the disposition survivor data as soon as possible after the disposition survivor data is released from hold or unlocked.

27 Claims, 5 Drawing Sheets

(56) References Cited

U.S. PATENT DOCUMENTS

| | | |
|---|---|---|
| 6,553,365 B1 | 4/2003 | Summerlin et al. |
| 6,607,389 B2 | 8/2003 | Genevie |
| 6,622,128 B1 | 9/2003 | Bedell et al. |
| 6,738,760 B1 | 5/2004 | Krachman |
| 6,805,351 B2 | 10/2004 | Nelson |
| 6,832,205 B1 | 12/2004 | Aragones et al. |
| 6,839,682 B1 | 1/2005 | Blume et al. |
| 6,944,597 B2 | 9/2005 | Callen et al. |
| 6,966,053 B2 | 11/2005 | Paris et al. |
| 6,976,083 B1 | 12/2005 | Baskey et al. |
| 6,981,210 B2 | 12/2005 | Peters et al. |
| 7,016,919 B2 | 3/2006 | Cotton et al. |
| 7,076,439 B1 | 7/2006 | Jaggi |
| 7,082,573 B2 | 7/2006 | Apparao et al. |
| 7,103,601 B2 | 9/2006 | Nivelet |
| 7,104,416 B2 * | 9/2006 | Gasco et al. .................. 220/608 |
| 7,107,416 B2 * | 9/2006 | Stuart et al. ..................... 711/159 |
| 7,120,914 B1 | 10/2006 | Manthos et al. |
| 7,127,470 B2 | 10/2006 | Takeya |
| 7,146,388 B2 | 12/2006 | Stakutis et al. |
| 7,162,427 B1 | 1/2007 | Myrick et al. |
| 7,197,716 B2 | 3/2007 | Newell et al. |
| 7,206,789 B2 | 4/2007 | Hurmiz et al. |
| 7,225,249 B1 | 5/2007 | Barry et al. |
| 7,233,959 B2 | 6/2007 | Kanellos |
| 7,236,953 B1 | 6/2007 | Cooper et al. |
| 7,240,296 B1 | 7/2007 | Matthews et al. |
| 7,249,315 B2 | 7/2007 | Moetteli |
| 7,281,084 B1 * | 10/2007 | Todd et al. ..................... 711/108 |
| 7,283,985 B2 | 10/2007 | Schauerte et al. |
| 7,284,985 B2 | 10/2007 | Genevie |
| 7,292,965 B1 | 11/2007 | Mehta et al. |
| 7,333,989 B1 | 2/2008 | Sameshima et al. |
| 7,386,468 B2 | 6/2008 | Calderaro et al. |
| 7,433,832 B1 | 10/2008 | Bezos et al. |
| 7,451,155 B2 | 11/2008 | Slackman et al. |
| 7,478,096 B2 | 1/2009 | Margolus et al. |
| 7,496,534 B2 | 2/2009 | Olsen et al. |
| 7,502,891 B2 | 3/2009 | Shachor |
| 7,512,636 B2 | 3/2009 | Verma et al. |
| 7,558,853 B2 | 7/2009 | Alcorn et al. |
| 7,580,961 B2 * | 8/2009 | Todd et al. .............................. 1/1 |
| 7,594,082 B1 * | 9/2009 | Kilday et al. .................. 711/154 |
| 7,596,541 B2 | 9/2009 | DeVries et al. |
| 7,614,004 B2 | 11/2009 | Milic-Frayling et al. |
| 7,617,458 B1 | 11/2009 | Wassom, Jr. et al. |
| 7,636,886 B2 | 12/2009 | Wyle et al. |
| 7,720,825 B2 * | 5/2010 | Pelletier et al. ............... 707/694 |
| 7,730,148 B1 | 6/2010 | Mace et al. |
| 7,742,940 B1 | 6/2010 | Shan et al. |
| 7,774,721 B2 | 8/2010 | Milic-Frayling et al. |
| 7,778,976 B2 | 8/2010 | D'Souza et al. |
| 7,861,166 B1 | 12/2010 | Hendricks |
| 7,865,817 B2 | 1/2011 | Ryan et al. |
| 7,895,229 B1 | 2/2011 | Paknad |
| 7,912,804 B1 | 3/2011 | Talwar et al. |
| 7,962,843 B2 | 6/2011 | Milic-Frayling et al. |
| 5,875,431 A1 | 12/2011 | Martin et al. |
| 8,073,729 B2 | 12/2011 | Kisin et al. |
| 2001/0053967 A1 | 12/2001 | Gordon et al. |
| 2002/0007333 A1 | 1/2002 | Scolnik et al. |
| 2002/0010708 A1 | 1/2002 | McIntosh |
| 2002/0022982 A1 | 2/2002 | Cooperstone et al. |
| 2002/0035480 A1 | 3/2002 | Gordon et al. |
| 2002/0083090 A1 | 6/2002 | Jeffrey et al. |
| 2002/0091553 A1 | 7/2002 | Callen et al. |
| 2002/0091836 A1 | 7/2002 | Moetteli |
| 2002/0095416 A1 | 7/2002 | Schwols |
| 2002/0103680 A1 | 8/2002 | Newman |
| 2002/0108104 A1 | 8/2002 | Song et al. |
| 2002/0119433 A1 | 8/2002 | Callender |
| 2002/0120859 A1 | 8/2002 | Lipkin et al. |
| 2002/0123902 A1 | 9/2002 | Lenore et al. |
| 2002/0143595 A1 | 10/2002 | Frank et al. |
| 2002/0143735 A1 | 10/2002 | Ayi et al. |
| 2002/0147801 A1 | 10/2002 | Gullotta et al. |
| 2002/0162053 A1 | 10/2002 | Os |
| 2002/0178138 A1 | 11/2002 | Ender et al. |
| 2002/0184068 A1 | 12/2002 | Krishnan et al. |
| 2002/0184148 A1 | 12/2002 | Kahn et al. |
| 2003/0004985 A1 | 1/2003 | Kagimasa et al. |
| 2003/0014386 A1 | 1/2003 | Jurado |
| 2003/0018520 A1 | 1/2003 | Rosenfeld et al. |
| 2003/0018663 A1 | 1/2003 | Cornette et al. |
| 2003/0031991 A1 | 2/2003 | Genevie |
| 2003/0033295 A1 | 2/2003 | Adler et al. |
| 2003/0036994 A1 | 2/2003 | Witzig et al. |
| 2003/0046287 A1 | 3/2003 | Joe |
| 2003/0051144 A1 | 3/2003 | Williams |
| 2003/0069839 A1 | 4/2003 | Whittington et al. |
| 2003/0074354 A1 | 4/2003 | Lee et al. |
| 2003/0097342 A1 | 5/2003 | Whittingtom |
| 2003/0110228 A1 | 6/2003 | Xu et al. |
| 2003/0139827 A1 | 7/2003 | Phelps |
| 2003/0208689 A1 | 11/2003 | Garza |
| 2003/0229522 A1 | 12/2003 | Thompson et al. |
| 2004/0002044 A1 | 1/2004 | Genevie |
| 2004/0003351 A1 | 1/2004 | Sommerer et al. |
| 2004/0019496 A1 | 1/2004 | Angie et al. |
| 2004/0034659 A1 | 2/2004 | Steger |
| 2004/0039933 A1 | 2/2004 | Martin et al. |
| 2004/0060063 A1 | 3/2004 | Russ et al. |
| 2004/0068432 A1 | 4/2004 | Meyerkopf et al. |
| 2004/0078368 A1 | 4/2004 | Excoffier et al. |
| 2004/0088283 A1 | 5/2004 | Lissar et al. |
| 2004/0088332 A1 | 5/2004 | Lee et al. |
| 2004/0088729 A1 | 5/2004 | Petrovic et al. |
| 2004/0103284 A1 | 5/2004 | Barker |
| 2004/0133573 A1 | 7/2004 | Miloushev et al. |
| 2004/0138903 A1 | 7/2004 | Zuniga |
| 2004/0143444 A1 | 7/2004 | Opsitnick et al. |
| 2004/0187164 A1 | 9/2004 | Kandasamy et al. |
| 2004/0193703 A1 | 9/2004 | Loewy et al. |
| 2004/0204947 A1 | 10/2004 | Li et al. |
| 2004/0215619 A1 | 10/2004 | Rabold |
| 2004/0216039 A1 | 10/2004 | Lane et al. |
| 2004/0260569 A1 | 12/2004 | Bell et al. |
| 2005/0060175 A1 | 3/2005 | Farber et al. |
| 2005/0071251 A1 | 3/2005 | Linden et al. |
| 2005/0071284 A1 | 3/2005 | Courson et al. |
| 2005/0074734 A1 | 4/2005 | Randhawa |
| 2005/0114241 A1 | 5/2005 | Hirsch et al. |
| 2005/0144114 A1 | 6/2005 | Ruggieri et al. |
| 2005/0149307 A1 | 7/2005 | Gurpinar et al. |
| 2005/0160361 A1 | 7/2005 | Young |
| 2005/0165734 A1 * | 7/2005 | Vicars et al. ....................... 707/2 |
| 2005/0187813 A1 | 8/2005 | Genevie |
| 2005/0203821 A1 | 9/2005 | Petersen et al. |
| 2005/0203931 A1 | 9/2005 | Pingree et al. |
| 2005/0240578 A1 | 10/2005 | Biederman et al. |
| 2005/0246451 A1 | 11/2005 | Silverman et al. |
| 2005/0283346 A1 | 12/2005 | Elkins et al. |
| 2006/0036464 A1 | 2/2006 | Cahoy et al. |
| 2006/0036649 A1 | 2/2006 | Simske et al. |
| 2006/0095421 A1 | 5/2006 | Nagai et al. |
| 2006/0136435 A1 | 6/2006 | Nguyen et al. |
| 2006/0143248 A1 | 6/2006 | Nakano et al. |
| 2006/0143464 A1 | 6/2006 | Ananthanarayanan et al. |
| 2006/0149407 A1 | 7/2006 | Markham et al. |
| 2006/0149735 A1 * | 7/2006 | DeBie et al. ....................... 707/8 |
| 2006/0156381 A1 * | 7/2006 | Motoyama ........................ 726/1 |
| 2006/0156382 A1 | 7/2006 | Motoyama |
| 2006/0167704 A1 | 7/2006 | Nicholls et al. |
| 2006/0174320 A1 | 8/2006 | Maru et al. |
| 2006/0178917 A1 | 8/2006 | Merriam et al. |
| 2006/0184718 A1 | 8/2006 | Sinclair |
| 2006/0195430 A1 | 8/2006 | Arumainayagam et al. |
| 2006/0229999 A1 | 10/2006 | Dodell et al. |
| 2006/0230044 A1 * | 10/2006 | Utiger .............................. 707/10 |
| 2006/0235899 A1 | 10/2006 | Tucker |
| 2006/0242001 A1 | 10/2006 | Heathfield |
| 2007/0016546 A1 | 1/2007 | DeVorchik et al. |
| 2007/0048720 A1 | 3/2007 | Billauer |
| 2007/0061156 A1 | 3/2007 | Fry et al. |

| | | |
|---|---|---|
| 2007/0061157 A1 | 3/2007 | Fry et al. |
| 2007/0078900 A1* | 4/2007 | Donahue .................. 707/200 |
| 2007/0099162 A1 | 5/2007 | Sekhar |
| 2007/0100857 A1 | 5/2007 | DeGrande et al. |
| 2007/0112783 A1 | 5/2007 | McCreight et al. |
| 2007/0118556 A1 | 5/2007 | Arnold et al. |
| 2007/0156418 A1 | 7/2007 | Richter et al. |
| 2007/0162417 A1 | 7/2007 | Cozianu et al. |
| 2007/0179829 A1 | 8/2007 | Laperi et al. |
| 2007/0179939 A1 | 8/2007 | O'Neil et al. |
| 2007/0203810 A1 | 8/2007 | Grichnik |
| 2007/0208690 A1 | 9/2007 | Schneider et al. |
| 2007/0219844 A1 | 9/2007 | Santorine et al. |
| 2007/0220435 A1 | 9/2007 | Sriprakash et al. |
| 2007/0245013 A1 | 10/2007 | Saraswathy et al. |
| 2007/0271230 A1 | 11/2007 | Hart et al. |
| 2007/0271308 A1 | 11/2007 | Bentley et al. |
| 2007/0271517 A1 | 11/2007 | Finkelman et al. |
| 2007/0282652 A1 | 12/2007 | Childress et al. |
| 2007/0288659 A1 | 12/2007 | Zakarian et al. |
| 2008/0033904 A1 | 2/2008 | Ghielmetti et al. |
| 2008/0034003 A1* | 2/2008 | Stakutis et al. .............. 707/200 |
| 2008/0059265 A1 | 3/2008 | Biazetti et al. |
| 2008/0059543 A1* | 3/2008 | Engel ........................ 707/204 |
| 2008/0070206 A1 | 3/2008 | Perilli |
| 2008/0071561 A1 | 3/2008 | Holcombe |
| 2008/0086506 A1 | 4/2008 | DeBie et al. |
| 2008/0091283 A1 | 4/2008 | Balci et al. |
| 2008/0126156 A1 | 5/2008 | Jain et al. |
| 2008/0147642 A1 | 6/2008 | Leffingwell et al. |
| 2008/0148193 A1 | 6/2008 | Moetteli |
| 2008/0148346 A1 | 6/2008 | Gill et al. |
| 2008/0154969 A1 | 6/2008 | DeBie |
| 2008/0154970 A1 | 6/2008 | DeBie |
| 2008/0177790 A1 | 7/2008 | Honwad |
| 2008/0195597 A1 | 8/2008 | Rosenfeld et al. |
| 2008/0209338 A1 | 8/2008 | Li |
| 2008/0229037 A1 | 9/2008 | Bunte et al. |
| 2008/0262898 A1 | 10/2008 | Tonchev et al. |
| 2008/0294674 A1 | 11/2008 | Reztlaff et al. |
| 2008/0301207 A1* | 12/2008 | Demarest et al. ............ 707/206 |
| 2008/0312980 A1 | 12/2008 | Boulineau et al. |
| 2008/0319958 A1 | 12/2008 | Bhattacharya et al. |
| 2008/0319984 A1 | 12/2008 | Proscia et al. |
| 2009/0037376 A1 | 2/2009 | Archer et al. |
| 2009/0043625 A1 | 2/2009 | Yao |
| 2009/0064184 A1 | 3/2009 | Chacko et al. |
| 2009/0094228 A1 | 4/2009 | Bondurant et al. |
| 2009/0100021 A1 | 4/2009 | Morris et al. |
| 2009/0106815 A1 | 4/2009 | Brodie et al. |
| 2009/0119677 A1 | 5/2009 | Stefansson et al. |
| 2009/0150168 A1 | 6/2009 | Schmidt |
| 2009/0150866 A1* | 6/2009 | Schmidt ........................ 717/120 |
| 2009/0150906 A1 | 6/2009 | Schmidt et al. |
| 2009/0157465 A1 | 6/2009 | Heathfield |
| 2009/0193210 A1 | 7/2009 | Hewett et al. |
| 2009/0241054 A1 | 9/2009 | Hendricks |
| 2009/0249179 A1 | 10/2009 | Shieh et al. |
| 2009/0249446 A1 | 10/2009 | Jenkins et al. |
| 2009/0254572 A1 | 10/2009 | Redlich et al. |
| 2009/0287658 A1 | 11/2009 | Bennett |
| 2010/0017756 A1 | 1/2010 | Wassom, Jr. et al. |
| 2010/0050064 A1 | 2/2010 | Liu et al. |
| 2010/0057418 A1 | 3/2010 | Li et al. |
| 2010/0070315 A1 | 3/2010 | Lu et al. |
| 2010/0088583 A1 | 4/2010 | Schachter |
| 2010/0250625 A1 | 9/2010 | Olenick et al. |
| 2010/0251109 A1 | 9/2010 | Jin et al. |
| 2011/0106773 A1 | 5/2011 | Smith et al. |
| 2011/0191344 A1 | 8/2011 | Jin et al. |

OTHER PUBLICATIONS www.pss-systems.com; retrieved from www.Archive.org any linkage dated Dec. 8, 2005, 130 pages.

PSS Systems, Inc., Atlas LCC for Litigation, pp. 1-2, www.pss-systems.com (Feb. 2008); PSS Systems, Inc., Map Your Data Sources, www.pss-systems.com (Feb. 200*); PSS Systems, Inc., "PSS Systems Provides Legal Hold and Retention Enforcement Automation Solutions for File Shares, Documentum, and other Data Sources." (Feb. 2008).

PSS Systems, Inc., Preservation Benchmarks for 2007 and Beyond, www.pss-systems.com, pp. 1-3 (2007).

PSS Systems, Inc., "Industry Leader PSS Systems Launches Third Generation of Atlas Legal Hold and Retention Management Software", pp. 1-2, www.pss-systems.com (Aug. 2007).

PSS Systems, Inc. Litigation Communications and Collections, www.pss-systems.com (2006), retrieved online on Dec. 8, 2010 from archive.org, 1 page.

Zhu, et al.; "Query Expansion Using Web Access Log Files", Lecture Notes in Computer Science, 2005, vol. 3588/2005, pp. 686-695, Springer-Verlag, Berlin, Hedelberg.

JISC infoNet, HEI Records Management: Guidance on Developing a File Plan. Jan. 1, 2007, 7 pages.

Cohasset Associate, Inc. "Compliance Requirements Assessment, IBM DB2 Records Manager and Record-Enabled Solutions", Oct. 31, 2004, Chicago, IL, 54 pp.

Lewis "Digital Mountin—Where Data Resides—Data Discovery from the Inside Out", available at http://digitalmountain.com/fullaccess/Article3.pdf accessed Mar. 13, 2012, Digital Mountain, Inc., 2004, 5 pgs.

Sears "E-Discovery: A Tech Tsunami Rolls In", available at http://www.krollontrack.com/publications/ediscoverybackgroundpaper.pdf, accessed Mar. 13, 2012, National Court Reporters Association, Apr. 2006, 7 pgs.

"Microsoft Computer Dictionary", Microsoft Press, Fifth Edition, 2002, p. 499.

* cited by examiner

METHOD AND APPARATUS FOR HANDLING EDGE-CASES OF EVENT-DRIVEN DISPOSITION

BACKGROUND OF THE INVENTION

1. Technical Field

The invention relates to systems for the disposition of data. More specifically, the invention relates to a method and apparatus for handling edge-cases of event-driven disposition.

2. Description of the Related Art

Business organizations retain electronic documents, records and other data in storage for extended periods of time for a number of reasons including easy access, internal policy, and regulation compliance, among other various reasons. For instance, government regulation may require an organization to retain certain securities information for a given duration for SEC compliance. Likewise, some organizations retain electronic records of documents for audit and/or litigation purposes.

Some known data storage systems involve storing data with an associated retention mark. The retention mark indicates a time period for the retention of the data and when the time period lapse, the data is typically disposed of automatically. Currently, a system administrator must manually manipulate the retention for a given datum when the retention is triggered by an external event. Organizations managing a large amount of stored data incur time-consuming and costly expenses in performing the updating and data disposition manually.

Furthermore, an error in data disposition may result in dire consequences. For instance, in cases where data was not disposed of, too much data has been disposed of, or wrong data has been disposed of, an organization may incur unwanted legal and business consequences. Therefore, there is a need in eliminating human factor from data disposition as much as possible.

There is no uniform view on how to manage disposition of data. This needs to be changed to get under control growing storage and legal costs associated with storing unnecessary information.

Different types of data is associated with different retention schedules, i.e. rules describing how long the information should be preserved in a certain data source, what is the event that triggers measuring of the disposition period, and what should be done with the information when the disposition period is due.

The methods of automatic event driven disposition described in U.S. patent application Ser. No. 12/164,468, filed on Jun. 30, 2008, published as United States Patent Publication No. 2009/0328070 and the methods of handling files on hold described in aU.S. patent application Ser. No. 12/164,524, filed on Jun. 30, 2008, published as United States Patent Publication No. 2009/0326969, now U.S. Pat. No. 7,792,945 address the functionality of an Information Lifecycle Management System that automatically disposes of the documents in multiple data sources that may be a subject for a legal hold. However, they do not provide expected results when it comes to:

Making sure that documents that have been on hold during the execution of a disposition request are disposed of according to their retention schedules after they have been released from hold. Hereinafter, we use the term "Disposition Survivors" for these documents.

Making sure that disposition of documents including Disposition Survivors is handled properly in scenarios when a retention schedule changes Making sure past events are handled properly.

It would be advantageous to provide a method and apparatus for handling edge-cases of event-driven disposition.

SUMMARY OF THE INVENTION

An embodiment of the invention provides a method and apparatus for handling edge-cases of event-driven disposition. In an embodiment, a method and apparatus for managing retention of data and for enforcing data holds, comprises at least one event consumer data source containing data that is subject to a retention schedule that defines rules for the disposition of the data. An enterprise retention management (ERM) application is provided to which the at least one event consumer is coupled. Means are provided for accepting at least one hold request in the ERM. The hold request defines at least a portion of the data that must be held from disposition, thus forming held data. Means are also provided for accepting a disposition request in the ERM. The disposition request comprises an instruction to dispose of at least a portion of the data based on the rules within the retention schedule. Means are further provided for filtering the disposition request, thus forming a filtered request comprising an instruction to dispose of a portion of data comprising the portion of data identified in the disposition request minus the held data. The held data comprises disposition survivor data. Means are also provided for executing the filtered request. Finally, an event-driven disposition mechanism is provided for disposing of the disposition survivor data as soon as possible after the disposition survivor data is released from hold or unlocked.

DETAILED DESCRIPTION OF THE INVENTION

Figure 1:
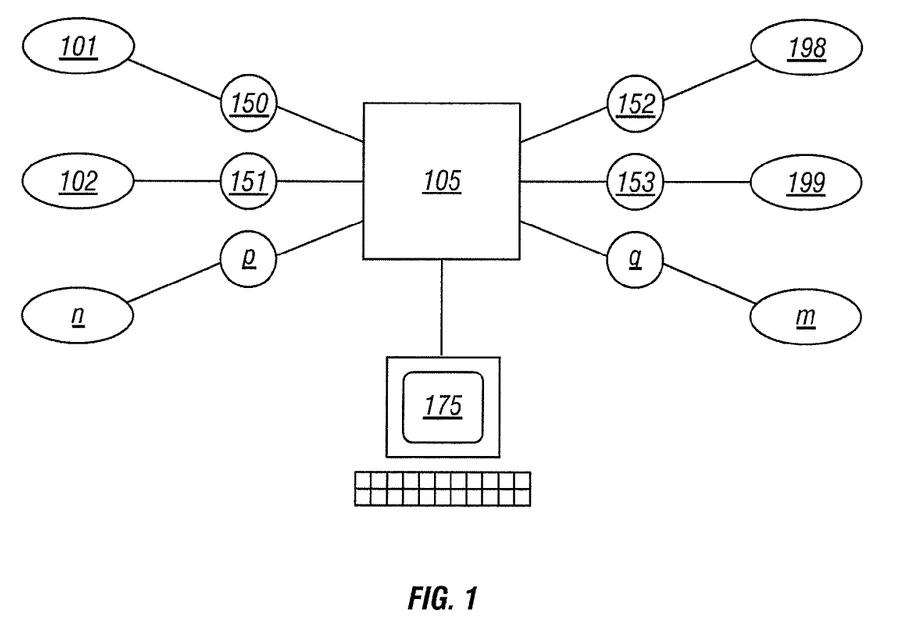
FIG. 1 is a block schematic diagram showing a business event driven disposition method according to the invention.

FIG. 1 is a block schematic diagram of a business event driven disposition method according to the invention. One or more event producer data source 101, 102 through n are provided. In some embodiments of the invention, the event producer data sources 101, 102 through n transmit information about business events. Examples of business events include the termination of an employee, an employee transfer, a change in familial status of an employee, a management decision to discontinue a product or a management decision to discontinue a service. Although these specific examples of business events are disclosed explicitly, it will be readily apparent to those having ordinary skill in the art that any business event that can affect the retention of data is equally envisioned. In some other embodiments of the invention, the data sources 101, 102 through n transmit hold instructions. Hold instructions comprise a readable instruction defining a portion of data that must be put on hold from disposition.

Business events are uploaded to an Enterprise Retention Management System 105 (hereinafter referred to as an "ERM"). In some embodiments of the invention, the event producer data sources 101, 102 through n push the business event to the ERM 105. In other embodiments, the business event is pulled from one of the event producer data sources 101, 102 through n into the ERM 105. In yet other embodiments, the business event is manually entered into the ERM 105. In some embodiments of the invention, a graphical user interface 175 is provided.

Also coupled to the ERM 105 are one or more event consumer data sources 198, 199 through m. A link is mapped between business events originating in the data sources 101, 102 through n and the data within the event consumers 198, 199 through m. As such, business events are able to affect the retention schedule of the data within the data sources 198, 199 through m.

The process of linking, mapping and propagating disposition request between event producers and event consumers is more fully explained in copending U.S. patent application Ser. No. 12/164,468, filed on Jun. 30, 2008, published as United States Patent Publication No. 2009/0328070, entitled Event Driven Disposition (hereinafter referred to as the "Event Driven Disposition" disclosure), which is incorporated herein in its entirety by this reference thereto.

According to some embodiments of the invention, one or more connectors 150, 151 through p and 152, 153 through q are established for communication between the event producers 101, 102 through n and the ERM, as well as the ERM and the event consumers 198, 199 through m. The connectors 150, 151 through p and 152, 153 through q perform a number of services. Some examples of services include configuration services, polling services, filtering services, parameter resolving services, and hold services. In some embodiments of the invention, the connectors provide reminder services. Although specific examples of services are provided, it will be readily apparent to those having ordinary skill in the art that the connectors perform a wide variety of services relating to retention, storage, holding, disposing, and/or reminder services, among others.

Methods and systems for managing electronic discovery and retention-holds are described in copending U.S. patent application Ser. No. 11/963,383, filed on Dec. 21, 2007, published as United States Patent Publication No. 2009-0165026, entitled Method and Apparatus For Electronic Data Discovery, which is incorporated herein in its entirety by this reference thereto. According to this disclosure, e-discovery collections and hold are performed through an Electronic Discovery Management Application (hereinafter referred to as an "EMA"). The EMA uses a connector coupled to a data source, which exposes a configuration service and a number of other services needed for processing collection and hold requests.

According to some embodiments of the invention, one or more of the event producer data sources 101, 102 through n transmit holds and the connectors 150, 151 through p and 152, 153 through q are capable of managing collections and holds. Documents that are on hold should not be disposed of in response to a disposition request. Therefore, the invention provides connectors that keep track of documents that are on hold and that make sure these documents are not disposed of. Additionally, there may be a situation when certain documents, which should have been disposed of were preserved because they were put on hold (in place) or locked in some other way. Therefore, the invention provides an event-driven disposition solution that disposes of these documents soon after they have been released from hold, or unlocked some other way. Furthermore, the retention schedule for a portion of data may evolve. For instance, a change in tax code may require a business to keep documents for a longer period of time for compliance. For stored taxed documents already on hold, it is important not to dispose of the documents between the time the hold is withdrawn and the time required by the new regulation. Therefore, the invention manages reminders, such that the data are not prematurely disposed of in light of an evolving retention schedule.

The specific setup for managing retention schedules, holds and reminders depends largely on what type of event consumer data source is being considered. In some embodiments, a method of determining what type of data sources are coupled to the ERM is accomplished with a polling step. For example, in the Event Driven Disposition disclosure, a method of determining information about event consumer is accomplished when event consumers are polled by ERM through a configuration service exposed by event consumer connector to return the types of disposition requests they can consume as well as the type of event consumer.

Likewise, according to some embodiments of the invention, a step of polling the event consumers is used to determine what the event consumers understand about holds and collections. In some embodiments of the invention, the polling step occurs when the ERM is configured. In some embodiments, the polling step occurs after the initial ERM configuration and before a hold request is propagated. In yet other embodiments, the information about what the event consumers understand about collections and/or hold is manually configured.

Disposition Survivors

There may be a situation when certain documents, which should have been disposed of were preserved because they resided on hold (in place) or locked in some other way. It would be beneficial for an event-driven disposition solution to be able to dispose of these documents soon after they have been released from hold (or unlocked).

Figure 2:
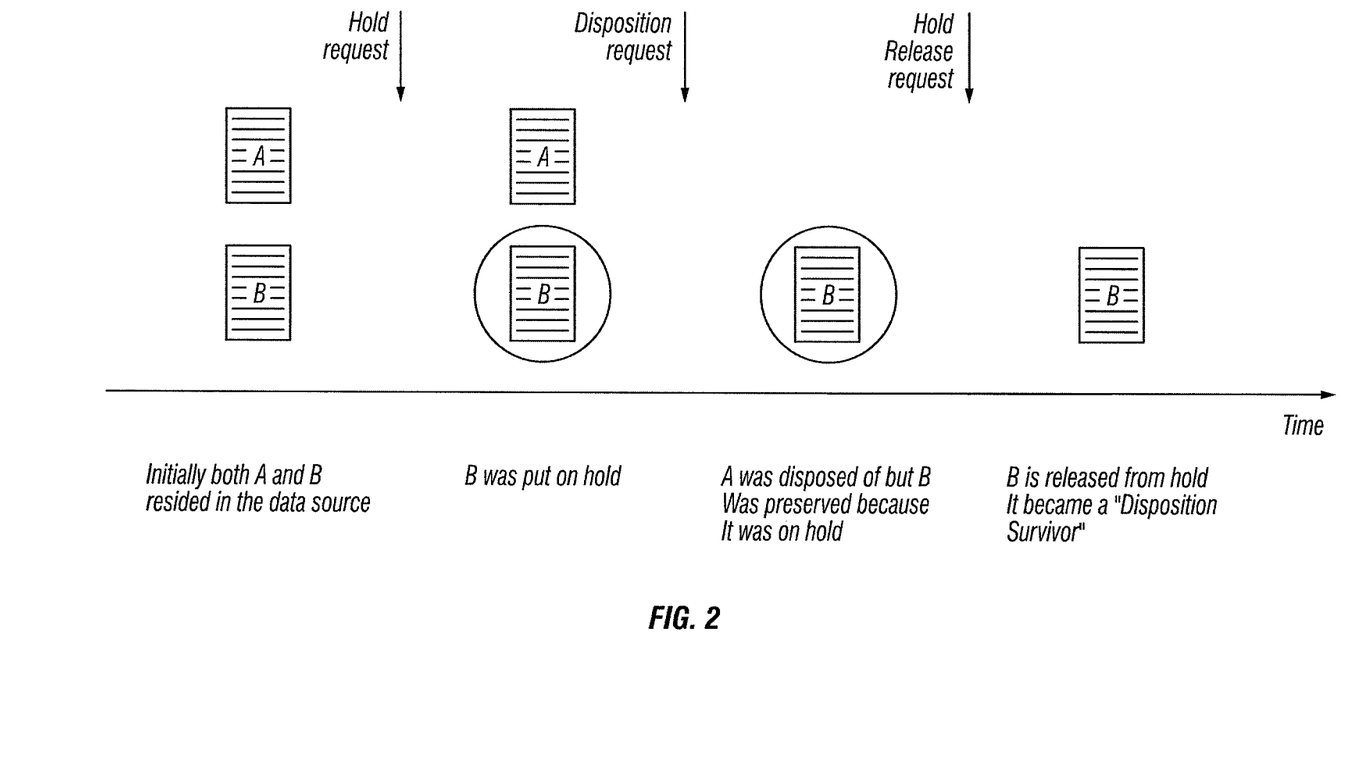
FIG. 2 is a timeline showing a disposition survivor according to the invention.

FIG. 2 is a timeline showing a disposition survivor according to the invention. In FIG. 2, documents A and B initially reside in a data source pursuant to a hold request. Document B is put on hold. A disposition request is made and document A is disposed of, but document B is preserved because it is on hold. A hold release request is made and document B is then released from hold. As such, it is a disposition survivor.

This problem may or may not exist in the data source/connector (hereinafter "Consumer") depending on Consumer capabilities. Based on these capabilities, Consumers can be classified as discussed below.

Disposition Survivor-Safe

This is a Consumer that can dispose of disposition survivors without external help.

An example of this is a file system connector that is responsible for putting files on hold and stores the list of files on hold in its database. Once such a connector receives a disposition request, it tries to delete all the files matching the request criteria unless they are recorded as being on hold in the connector's database. If a file on hold is identified during the disposition request, the connector persists a current disposition request, or it does not delete the request if it has been persisted, into its own persistence layer (database) and periodically tries to re-execute this request until there are no files matching the request criteria that remain on hold. After that the request is deleted from the database.

Figure 3:
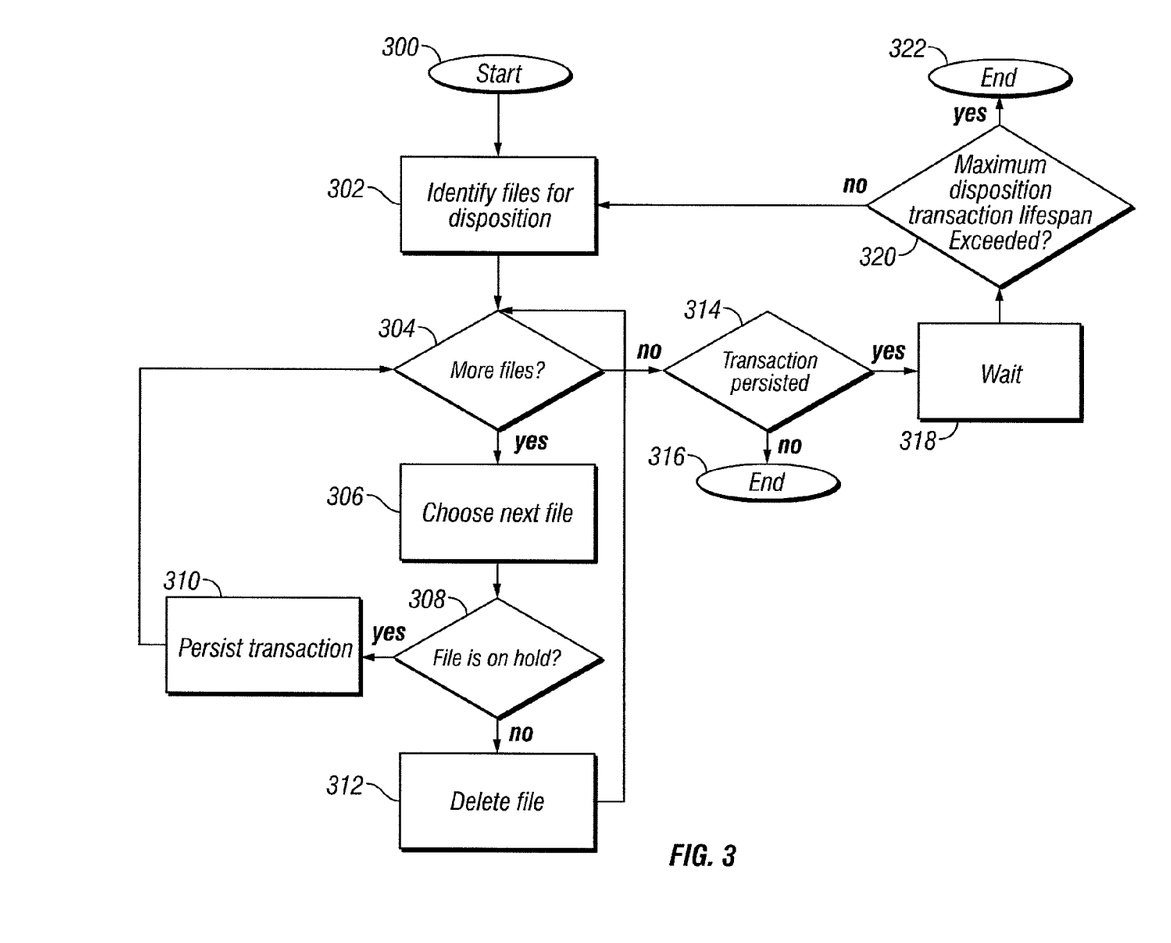
FIG. 3 is a flow diagram showing the performance of a disposition in a disposition survivor-safe consumer according to the invention.

FIG. 3 is a flow diagram showing the performance of a disposition in a disposition survivor-safe consumer according to the invention. In FIG. 3, the process starts (300) and files are identified for disposition (302). A determination is made is there are more file for disposition (304) and, if so, the next file is chosen (306). A determination is made whether or not the file is on hold (308); if so, the transaction persists (310). Otherwise, the file is deleted (312) and the process continues (304). If there are no more files (304), a determination is made whether or not the transaction persists (314); if so, the system waits (318). Otherwise, the process ends (316). If the wait exceeds a maximum disposition transaction lifespan (320) the process ends (322). Otherwise, the process continues (302).

A disposition survivor-safe connector can also be implemented on top of a data source that prevents the connector from deleting a document, even if the connector does not know that the document is on hold. For example, an event consumer connector on top of a Documentum™ record management repository tries to delete a document from the repository and fails when the document has been put on hold by a Retention Policy Services module of Documentum™. Once this has happened, the connector persists the current disposition request into its own database and periodically tries to re-execute this request until there are no files matching the request criteria that remain on hold. After that, the request is deleted from the database. This algorithm is a modification of the previous one, except that instead of consulting its own database, the connector consults the underlying data source's hold module to check which documents are on hold.

Disposition Survivor-Unsafe

In other scenarios, the Consumer cannot dispose of disposition survivors. We call such Consumer's disposition survivor-unsafe.

Note that in copending U.S. patent application Ser. No. 12/164,468, filed on Jun. 30, 2008, published as United States Patent Publication No. 2009/0328070, we also classified Consumers into retention-capable, i.e. those who can enforce retention schedules for themselves and require only the knowledge of a disposition triggering event; and simple, i.e. those who cannot enforce retention schedules and require immediate disposition requests to be dispatched to them at the time of disposition. These two classifications are orthogonal to each other, although in real life retention-capable Consumers are likely to be disposition survivor-safe, and simple Consumers are likely to be disposition survivor-unsafe.

Sending Disposition Reminders

Disposition Survivor-Unsafe Consumers

Figure 4:
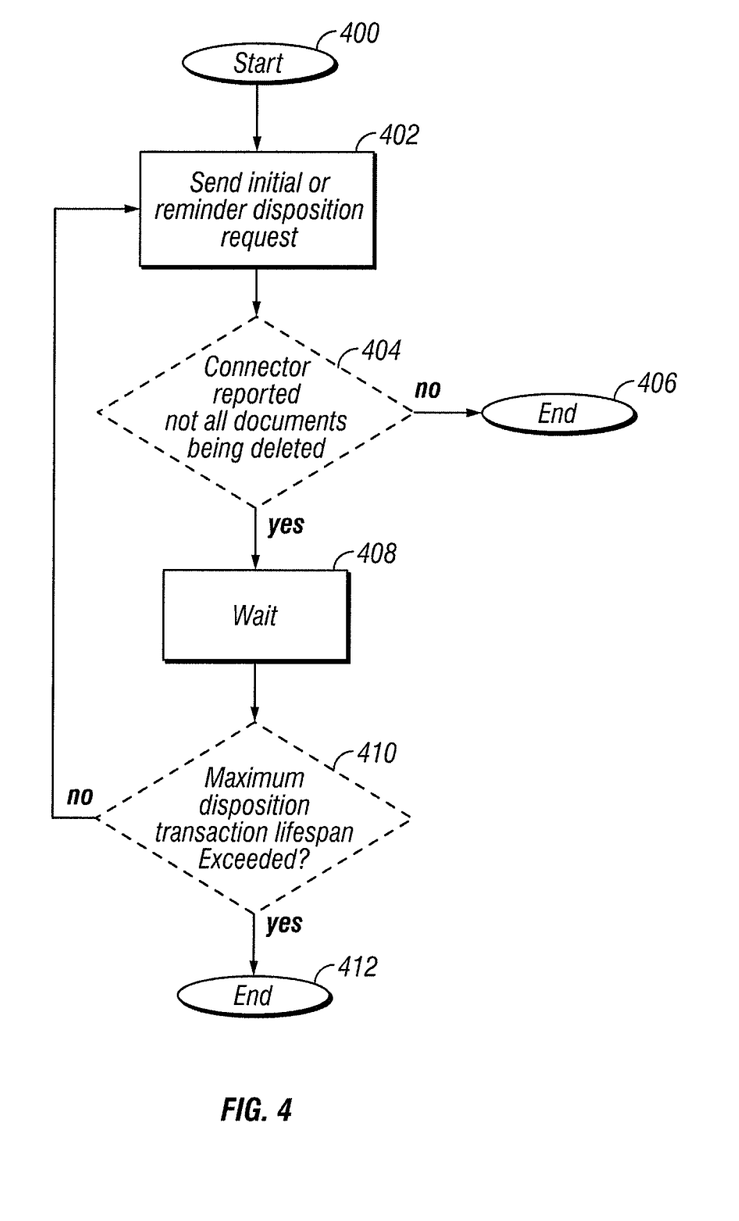
FIG. 4 is a flow diagram showing logic for sending disposition reminders to simple disposition survivor-unsafe consumers according to the invention, optional logic is indicated in FIG. 4 with a dashed line.

FIG. 4 is a flow diagram showing logic for sending disposition reminders to simple disposition survivor-unsafe consumers according to the invention, optional logic is indicated in FIG. 4 with a dashed line. The process starts (400). To make disposition survivor-unsafe Consumers capable of disposing of disposition survivors, the logic sends the Consumer a disposition reminder request to re-evaluate a disposition request (402). Optionally, a determination is made whether or not a connector reported that not all documents were being deleted (404). If all documents are deleted, the process ends (406). Otherwise, the process proceeds to wait (408). Optionally, a determination is made whether or not a maximum disposition transaction lifespan is exceeded (410). If so, the process ends (412); otherwise, the process continues (402).

In a response to the reminder, the Consumer re-executes the disposition attempt, and disposes of disposition survivors that were released from hold since the initial disposition request or the previous disposition reminder.

The logic should be informed whether a Consumer is disposition survivor-safe or unsafe. This can be achieved through a response to a configuration service request. In addition to the information returned in a configuration service response described in copending U.S. patent application Ser. No. 12/164,468, filed on Jun. 30, 2008, published as United States Patent Publication No. 2009/0328070, and U.S. patent application Ser. No. 12/164,524, filed on Jun. 30, 2008, published as United States Patent Publication No. 2009/03266969, now U.S. Pat. No. 7,792,945, the configuration service response may contain any or all of the following parameters:

A Consumer disposition survivor-safe (disposition survivor-unsafe) flag is set, indicating whether the Consumer is disposition survivor-safe or unsafe.

A reminder frequency (reminder period) parameter is set, indicating how often the reminder should be sent to the consumer.

A maximum disposition transaction lifespan parameter is set, indicating for how long the ERM should remind the consumer about disposition and/or for how long disposition a survivor-safe Consumer attempts to get rid of disposition survivors. These may be two different parameters.

The ERM can overwrite the default values coming from configuration service, as well as to reset default values.

Although the existence of a configuration service is highly desirable, the same information can be also received by logic through a user interface and configuration files.

For simple Consumers, reminders are sent periodically after the initial disposition request has been issued.

For retention-capable Consumers, the ERM starts sending the reminders after the estimated time of first disposition attempt. The ERM sends a scheduled disposition request immediately after it receives an event. Therefore, it does not control the actual disposition process on the Consumer side.

Retention-capable consumers can initiate the first disposition attempt. But disposition survivor-unsafe Consumers cannot initiate additional attempts. Therefore, they must be reminded to do that by the ERM.

To send a reminder, the ERM calculates the time when the Consumer should have started the initial disposition attempt if it acts according to the retention schedule. Then, the ERM waits for a reminder frequency period and issues a reminder.

Such a consumer is very unlikely ever to exist because, if it is aware of a retention schedule and can perform an initial disposition attempt, most likely it is able to perform subsequent attempts. Or it would be easier to implement such connector as a simple connector.

A disposition reminder request can have the same format as an immediate disposition request. In particular, it may contain all the information necessary to perform the disposition attempt so the Consumer does not need to remember disposition criteria between attempts.

Handling Changing Triggering Event Types in Retention Schedules

If the event type changed in a retention schedule, the ERM:
Stops sending disposition reminders to disposition survivor-unsafe Consumers;
Sends the new retention schedule to retention-capable consumers; and
Notifies the ERM administrator that the event type coming from the producer may not longer match the retention schedule associated with the route.

Handling Changing Disposition Periods in Retention Schedules for Simple Consumers Once the Event is Inside the ERM, but has not yet been Propagated to the Consumer As described in copending U.S. patent application Ser. No. 12/164,468, filed on Jun. 30, 2008, published as United States Patent Publication No. 2009/0328070, simple Consumers are those who cannot enforce retention schedules and who require immediate disposition requests to be dispatched to them at the time of disposition. Copending U.S. patent application Ser. No. 12/164,468, filed on Jun. 30, 2008 published as United States Patent Publication No. 2009/0328070, suggests that the ERM calculate the disposition time for such a consumer and send an immediate disposition request to the Consumer at the time when disposition should be executed.

There may be a situation when a retention period in a retention schedule associated with the route pointing to a simple event consumer has been changed after the event entered the ERM, but before the disposition request has been sent to the Consumer.

In this situation, the ERM should:
Calculate the new time if the immediate disposition request;
If the newly calculated time is in future, do nothing; and
Issue an immediate disposition request immediately if the newly calculated time happened in the past.

To achieve this, the ERM does not try to calculate the disposition dates for simple consumers upfront. Instead, it periodically checks whether the event is ready to be forwarded to the event consumer by comparing the current date time with the date time calculated based on event occurrence date and retention rules. This allows the ERM to change retention rules with ease, without the need to recalculate anything in event tables.

Alternatively, the ERM may calculate the disposition time upfront, but recalculate it each time retention schedule has changed for disposition transaction that refer to this retention schedule.

Handling Changing Disposition Periods in Retention Schedules after Immediate Disposition Request has been Sent to a Simple Consumer Simple Disposition Survivor-Unsafe Consumer There may be a situation when the underlying retention schedule changed between the initial disposition request call and a disposition reminder request. It may result in the outcome for a disposition survivor-unsafe consumer that a disposition time has come and the ERM already sent a disposition request. As a result, the connector performed one or multiple attempts to delete the documents. But there are still some documents on hold. So the connector is waiting for disposition reminders to perform more attempts.

In this case, if the new disposition time is in future, the ERM refrains from sending reminders until the new disposition time comes. If the new disposition time is in the past, the ERM continues sending reminders.

Simple Disposition Survivor-Safe Consumer

As opposed to the previous scenario, a disposition survivor-safe Consumer has a built-in mechanism that identifies disposition survivors periodically or on event-driven basis, and that tries to dispose of them without any interaction with the ERM. It is essential to suspend this mechanism for a while when the disposition time shifts to the future. To achieve this, in a response to a configuration service request, a disposition survivor-safe Consumer specifies the maximum disposition transaction lifespan, which is the maximum period after which the Consumer stops the attempts to dispose of remaining disposition survivors. If this period is not specified, it can be treated by the ERM as infinity, or the ERM may impose its own maximum disposition transaction lifespan for the Consumer.

Once a retention time in the retention schedule is changed, and the new time happens to be in future, the ERM identifies all the disposition transactions where disposition survivor-safe Consumers are involved and for which maximum disposition transaction lifespan is in future and an immediate disposition request has already been sent. For example, if on Mar. 2, 2007 the schedule is changed, transaction 123 started on Jan. 1, 2007, and its maximum disposition transaction lifespan is two years, and an immediate disposition request has been sent on Feb. 1, 2007, such a transaction is selected.

Consumers involved in such transactions receive stop disposition message from the ERM, which contains identifiers of disposition transactions that must be stopped. When the new disposition time is due for each of these transactions, the ERM re-issues an immediate disposition request.

Once a retention time in the retention schedule is changed, and the new time happens to be in past, the ERM identifies all the disposition transactions affected by this retention schedule. If no immediate disposition request has been issued within this transaction yet, the ERM issues such a request. Otherwise, it does nothing.

Handling Changing Disposition Periods in Retention Schedules after Immediate Disposition Request has been Sent to a Retention-Capable Consumer As opposed to simple Consumers, retention-capable Consumers receive scheduled disposition requests immediately after the event is registered by the EMA. As a result, it is highly unlikely (and can be made impossible) that the retention period has been changed after the event is received by ERM but before it has been propagated to Consumer.

Retention-Capable Disposition Survivor-Safe Consumer

This Consumer can store and understand retention schedules and manage the disposition of disposition survivors. When the retention period changes, the ERM propagates the new retention schedule to such a Consumer as fast as possible if the Consumer involved in any disposition transaction whose start time plus maximum disposition transaction lifespan is in the future; and the consumer is expected to act accordingly.

Retention-Capable Disposition Survivor-Unsafe Consumer

Figure 5:
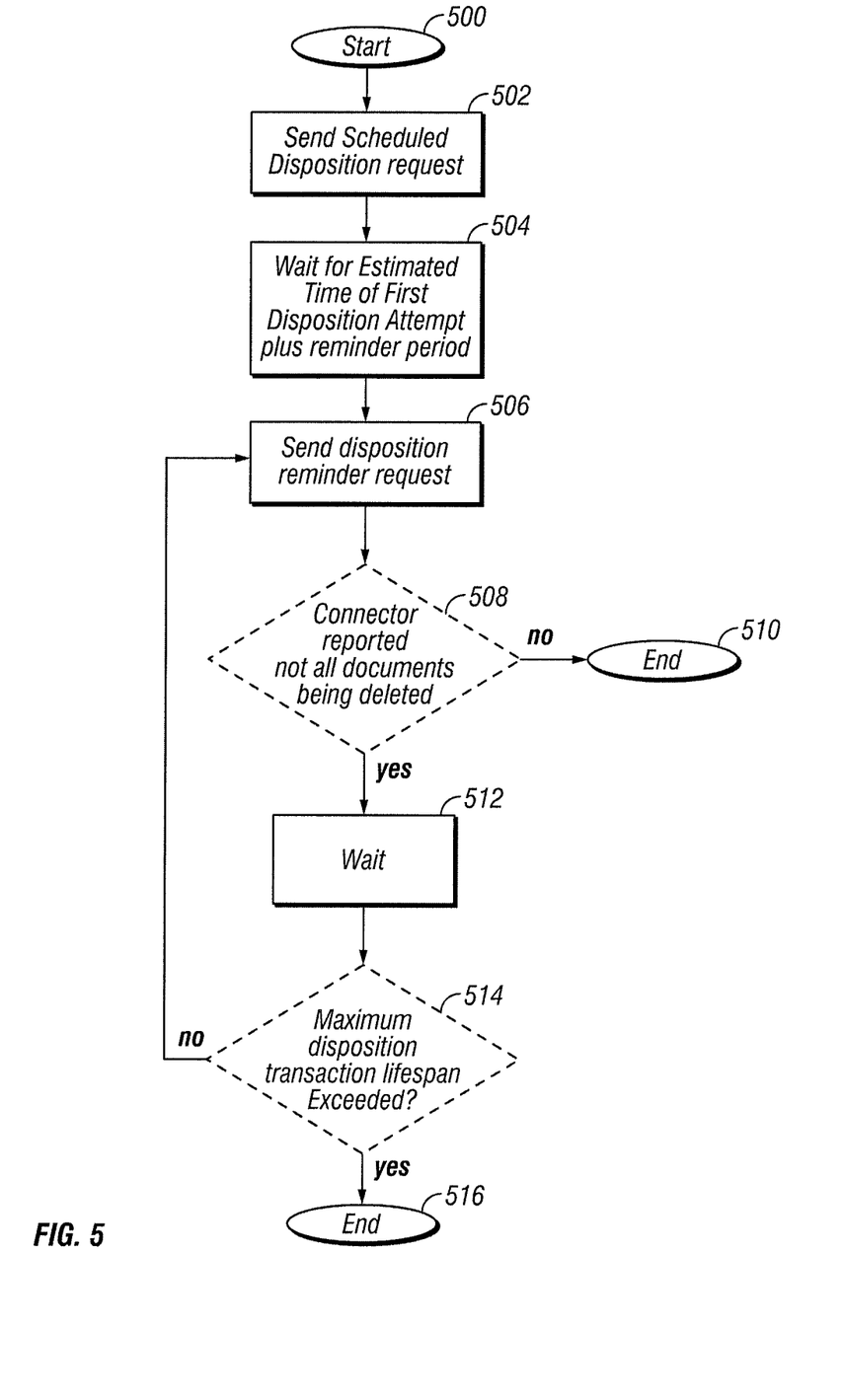
FIG. 5 is a flow diagram showing logic for sending disposition reminders to retention-capable disposition survivor-unsafe consumers according to the invention, optional logic is indicated in FIG. 5 with a dashed line.

FIG. 5 is a flow diagram showing logic for sending disposition reminders to retention-capable disposition survivor-unsafe consumers according to the invention, optional logic is indicated in FIG. 5 with a dashed line. In FIG. 5, the process starts (500) and a scheduled disposition request is sent (502). The system waits for an estimated time of a first disposition attempt plus a remainder period (504). The disposition reminder request is then sent (506). Optionally, a determination is made whether of not the connector reported that all documents are being deleted (506). If not, the process ends (510); otherwise, the systems waits (512). A further optionally determination is ay be made whether or not a maximum disposition transaction lifespan is exceeded (514). If not, the process continues (506); otherwise the process ends (516).

When retention period has changed and the Consumer involved in any disposition transaction whose start time plus maximum disposition transaction lifespan is in the future, the ERM:
Sends a new retention schedule to the consumer and expects the consumer to start its initial disposition attempts according to the new schedule.
Calculates the disposition time according to the schedule; and If new estimated time of first disposition attempt plus reminder frequency period is still in future, refrains from sending reminders;

Otherwise, it starts sending reminders.

Triggering Legacy Events

Routes can be established after the ERM receives events from event producers, presumably because other routes used the same Producers. The ERM can either propagate only the events that entered the ERM after the route has been established, or it can also propagate old events to the newly established route. This behavior can also be dynamically configured on the application level and applies all the routes created afterwards. Or, it can be decided during the route setup by offering the user to propagate old events and even allowing him to choose particular events that must be propagated.

Although the invention is described herein with reference to the preferred embodiment, one skilled in the art will readily appreciate that other applications may be substituted for those set forth herein without departing from the spirit and scope of the present invention. Accordingly, the invention should only be limited by the Claims included below.

The invention claimed is:

1. A computer implemented method for managing retention of data and for enforcing data holds, comprising the steps of:
   providing at least one event consumer data source containing data, wherein the data is subject to a retention schedule defining rules for the disposition of the data;
   providing an enterprise retention management (ERM) application, wherein the at least one event consumer is coupled with the ERM;
   accepting at least one hold request in the ERM, wherein the hold request defines at least a portion of the data that must be held from disposition, forming held data;
   accepting a disposition request in the ERM, wherein the disposition request comprises an instruction to dispose of at least a portion of the data based on the rules within the retention schedule;
   filtering the disposition request, without the need for approval from an operator, forming a filtered request comprising an instruction to dispose of a portion of data comprising the portion of data identified in the disposition request minus the held data, said held data comprising disposition survivor data;
   executing the filtered request; and
   providing an event-driven disposition mechanism for disposing of said disposition survivor data in an immediately subsequent disposition cycle after said disposition survivor data is released from hold or unlocked, wherein the step of providing an event-driven disposition mechanism further comprises:
      providing a file system connector that is responsible for putting files on hold and storing a list of files on hold in a connector database;
      once said connector receives a disposition request, said connector attempting to delete all files matching said disposition request criteria, unless said files are identified as being on hold in said connector database;
      wherein if a file on hold is identified during said disposition request, said connector persisting a current disposition request into said database and periodically trying to re-execute said request until there are no files matching the request criteria that remain on hold;
      thereafter deleting said request from said connector database; and
      informing said disposition mechanism logic whether an event consumer is disposition survivor-safe or unsafe in response to a configuration service request, said response to said configuration service request comprising any or all of the following parameters:
         a consumer disposition survivor-safe (disposition survivor-unsafe) flag that is set to indicate whether the consumer is disposition survivor-safe or unsafe;
         a reminder frequency (reminder period) parameter that is set to indicate how often a reminder should be sent to the event consumer; and
         a maximum disposition transaction lifespan parameter that is set to indicate for how long the ERM should remind the event consumer about disposition and/or for how long a disposition survivor-safe event consumer attempts to get rid of disposition survivors.

2. The method of claim 1, said event consumer comprising a disposition survivor-safe consumer, wherein said event consumer can dispose of disposition survivor data without external help.

3. The method of claim 2, further comprising the steps of:
   implementing a disposition survivor-safe connector on top of a data source that prevents said connector from deleting a document, even if said connector does not know that said document is on hold, said data source comprising a data source database;
   said connector persisting a current disposition request into said connector database and periodically trying to re-execute said request until there are no files matching the request criteria that remain on hold is said data source database; and
   thereafter deleting said request from said connector database.

4. The method of claim 1, said event consumer comprising a disposition survivor-unsafe consumer that cannot dispose of disposition survivors.

5. The method of claim 4, wherein disposition survivor-unsafe event consumers cannot manually initiate additional attempts to dispose of disposition survivors.

6. The method of claim 1, said event consumer comprising a retention-capable survivor that can enforce retention schedules and that only requires a disposition triggering event to effect disposition.

7. The method of claim 6, wherein for retention-capable consumers said ERM starts sending reminders after an estimated time of first disposition attempt.

8. The method of claim 6, wherein for retention-capable consumers said ERM sends a scheduled disposition request immediately after it receives an event.

9. The method of claim 1, said event consumer comprising a simple consumer that cannot enforce retention schedules and that requires immediate disposition requests to be dispatched to it at the time of disposition.

10. The method of claim 9, wherein for simple event consumers reminders are sent periodically after initial disposition request has been issued.

11. The method of claim 1, said disposition mechanism implementing the step of:
   in response to a reminder, said consumer re-executing a disposition attempt, and disposing of disposition survivors that were released from hold since an initial disposition request of a last disposition reminder.

12. The method of claim 1, wherein said ERM overwrites and/or resets default values provided by said configuration service.

13. The method of claim 1, wherein said configuration service comprises a user interface and/or configuration files.

14. The method of claim 1, said disposition mechanism implementing the steps of:
said ERM calculating a time when an event consumer should have started an initial disposition attempt if it acts according to a retention schedule;
said ERM waiting for a reminder frequency period; and thereafter said ERM issuing a reminder.

15. The method of claim 14, wherein a disposition reminder request has the same format as an immediate disposition request; and wherein said disposition reminder request contain information necessary to perform a disposition attempt.

16. The method of claim 1, further comprising the step of:
handling changing triggering event types in retention schedules;
wherein if an event type changes in a retention schedule, said ERM performs any of the following:
stops sending disposition reminders to disposition survivor-unsafe event consumers;
sends a new retention schedule to retention-capable consumers; and
notifies an ERM administrator that an event type coming from an event producer may not longer match a retention schedule associated with a route.

17. The method of claim 1, further comprising the step of:
handling changing disposition periods in retention schedules for simple consumers once an event is inside the ERM, but has not yet been propagated to an event consumer by:
calculating a new time if an immediate disposition request is presented;
if a newly calculated time is in future, doing nothing; and
issuing an immediate disposition request immediately if a newly calculated time happened in the past.

18. The method of claim 17, further comprising the step of:
said ERM periodically checking whether an event is ready to be forwarded to an event consumer by comparing a current date time with a date time calculated based on an event occurrence date and retention rules;
wherein said ERM may change retention rules without the need to recalculate anything in event tables.

19. The method of claim 17, further comprising the step of:
said ERM calculating a disposition time upfront, and recalculating said disposition time each time a retention schedule has changed for a disposition transaction that refer to said retention schedule.

20. The method of claim 1, further comprising the step of:
handling changing disposition periods in retention schedules after an immediate disposition request has been sent to a simple consumer, wherein if a new disposition time is in future, the ERM refrains from sending reminders until a new disposition time comes; and wherein if a new disposition time is in the past, the ERM continues sending reminders.

21. The method of claim 1, said event consumer further comprising a simple disposition survivor-safe consumer;
wherein in response to a configuration service request, said disposition survivor-safe consumer specifies a maximum disposition transaction lifespan, which comprises a maximum period after which said disposition survivor-safe consumer stops attempting to dispose of remaining disposition survivors;
wherein if said period is not specified, it can be treated by the ERM as infinity, or the ERM imposes its own maximum disposition transaction lifespan for the disposition survivor-safe consumer;
wherein once a retention time in a retention schedule is changed, and the new time happens to be in future, the ERM identifies all disposition transactions where disposition survivor-safe consumers are involved and for which a maximum disposition transaction lifespan is in the future and an immediate disposition request has already been sent;
wherein disposition survivor-safe consumers involved in such transactions receive a stop disposition message from the ERM, which contains identifiers of disposition transactions that must be stopped;
wherein when a new disposition time is due for each of these transactions, the ERM re-issues an immediate disposition request;
wherein once a retention time in a retention schedule is changed, and a new time happens to be in past, the ERM identifies all the disposition transactions affected by this retention schedule; and
wherein if no immediate disposition request has been issued within this transaction yet, the ERM issues such a request.

22. The method of claim 1, further comprising the step of:
handling changing disposition periods in retention schedules after an immediate disposition request has been sent to a retention-capable consumer.

23. The method of claim 1, further comprising the steps of:
providing a retention-capable disposition survivor-safe consumer that can store and understand retention schedules and manage the disposition of disposition survivors;
wherein, when the retention period changes, the ERM propagates a new retention schedule to said retention-capable disposition survivor-safe consumer if the retention-capable disposition survivor-safe consumer is involved in any disposition transaction whose start time plus maximum disposition transaction lifespan is in the future, wherein the propagation of a new retention schedule is assigned an increased execution priority; and the retention-capable disposition survivor-safe consumer is expected to act accordingly.

24. The method of claim 1, further comprising the step of:
providing a retention-capable disposition survivor-unsafe consumer, wherein when a retention period has changed and the retention-capable disposition survivor-unsafe consumer involved in any disposition transaction whose start time plus maximum disposition transaction lifespan is in the future, the ERM:
sends a new retention schedule to the retention-capable disposition survivor-unsafe consumer and expects the retention-capable disposition survivor-unsafe consumer to start its initial disposition attempts according to the new schedule;
calculates a disposition time according to the new schedule;
if a new estimated time of first disposition attempt plus reminder frequency period is still in future, refrains from sending reminders; and
otherwise, the ERM starts sending reminders.

25. The method of claim 1, further comprising the step of:
the ERM either propagating only events that entered the ERM after a route has been established, and/or the ERM also propagating old events to a newly established route.

26. The method of claim 25, further comprising the step of:
dynamically configuring ERM behavior on an application level and applying all routes created afterwards, or deciding ERM behavior during route setup by offering a user to propagate old events and allowing said user to choose particular events that must be propagated.

27. An apparatus for managing retention of data and for enforcing data holds, comprising:
- at least one event consumer data source containing data, wherein the data is subject to a retention schedule defining rules for the disposition of the data;
- an enterprise retention management (ERM) application, wherein the at least one event consumer is coupled with the ERM;
- at least one connector comprising an interface between Said ERM and said at least one event consumer, wherein said at least one connector comprises a plurality of processing modules for performing operations on said data sources, said at least one connector further comprising:
  - a module for accepting at least one hold request in the ERM, wherein the hold request defines at least a portion of the data that must be held from disposition, forming held data;
  - a module for accepting a disposition request in the ERM, wherein the disposition request comprises an instruction to dispose of at least a portion of the data based on the rules within the retention schedule;
  - a module for filtering the disposition request, forming a filtered request comprising an instruction to dispose of a portion of data comprising the portion of data identified in the disposition request minus the held data, said held data comprising disposition survivor data;
  - a module for executing the filtered request;
- an event-driven disposition mechanism for disposing of said disposition survivor data in an immediately subsequent disposition cycle after said disposition survivor data is released from hold or unlocked; and
- a module for informing said disposition mechanism logic whether an event consumer is disposition survivor-safe or unsafe in response to a configuration service request, said response to said configuration service request comprising any or all of the following parameters:
  - a consumer disposition survivor-safe (disposition survivor-unsafe) flag that is set to indicate whether the consumer is disposition survivor-safe or unsafe:
  - a reminder frequency (reminder period) parameter that is set to indicate how often a reminder should be sent to the event consumer; and
  - a maximum disposition transaction lifespan parameter that is set to indicate for how long the ERM should remind the event consumer about disposition and/or for how long a disposition survivor-safe event consumer attempts to get rid of disposition survivors.

* * * * *